(12) United States Patent
Reisen

(10) Patent No.: US 11,275,501 B2
(45) Date of Patent: *Mar. 15, 2022

(54) CREATING TABLES USING GESTURES

(71) Applicant: Atlassian Pty Ltd., Sydney (AU)

(72) Inventor: Marc Andrew Reisen, San Francisco, CA (US)

(73) Assignee: ATLASSIAN PTY LTD., Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/239,552

(22) Filed: Apr. 24, 2021

(65) Prior Publication Data

US 2021/0240340 A1 Aug. 5, 2021

Related U.S. Application Data

(63) Continuation of application No. 16/808,940, filed on Mar. 4, 2020, now Pat. No. 10,990,277, which is a continuation of application No. 15/282,806, filed on Sep. 30, 2016, now Pat. No. 10,620,824.

(51) Int. Cl.
*G06F 40/00* (2020.01)
*G06F 3/04883* (2022.01)
*G06F 3/0482* (2013.01)
*G06F 3/04845* (2022.01)
*G06F 40/177* (2020.01)

(52) U.S. Cl.
CPC ........ *G06F 3/04883* (2013.01); *G06F 3/0482* (2013.01); *G06F 3/04845* (2013.01); *G06F 40/177* (2020.01)

(58) Field of Classification Search
CPC .. G06F 17/245; G06F 3/04883; G06F 3/0488; G06F 3/0482; G06F 3/04845; G06F 40/177

See application file for complete search history.

(56) References Cited

U.S. PATENT DOCUMENTS

| | | | |
|---|---|---|---|
| 5,031,121 | A | 7/1991 | Iwai |
| 9,697,423 | B1 | 7/2017 | Bellert |
| 10,635,262 | B2 * | 4/2020 | Stewart ................... G06T 13/80 |

(Continued)

FOREIGN PATENT DOCUMENTS

WO  WO9601453  1/1996

*Primary Examiner* — Scott T Baderman
*Assistant Examiner* — Barbara M Level
(74) *Attorney, Agent, or Firm* — Brownstein Hyatt Farber Schreck, LLP

(57) ABSTRACT

A method comprising displaying, on a touchscreen, a digital electronic document; receiving first input from the touchscreen and determining that the first input comprises a rectangle gesture; receiving second input from the touchscreen and determining that the second input comprises a subdivision gesture that indicates dividing the rectangle; determining that the first input and the second input have been received within a time threshold; in response to determining that the first input and second input have been received within the time threshold, automatically generating a table that comprises a plurality of cells; automatically placing the table in the document at a location that is based on the first input and updating the document that is displayed on the touchscreen to visually show the table; wherein the method is performed by one or more computing devices.

20 Claims, 5 Drawing Sheets

(56) References Cited

U.S. PATENT DOCUMENTS

| | | |
|---|---|---|
| 2001/0049699 A1 | 12/2001 | Pratley |
| 2004/0194029 A1 | 9/2004 | Altman |
| 2006/0080597 A1 | 4/2006 | Shima |
| 2007/0180392 A1 | 8/2007 | Russo |
| 2009/0245645 A1 | 10/2009 | Xing |
| 2011/0078560 A1 | 3/2011 | Weeldreyer |
| 2014/0359419 A1 | 12/2014 | Kang |
| 2016/0154579 A1* | 6/2016 | Lee .................... G06K 9/00402 382/189 |
| 2016/0364134 A1 | 12/2016 | Wu |
| 2017/0060819 A1 | 3/2017 | Rucine |
| 2017/0206406 A1 | 7/2017 | Onis |
| 2018/0095654 A1 | 4/2018 | Reisen |

* cited by examiner

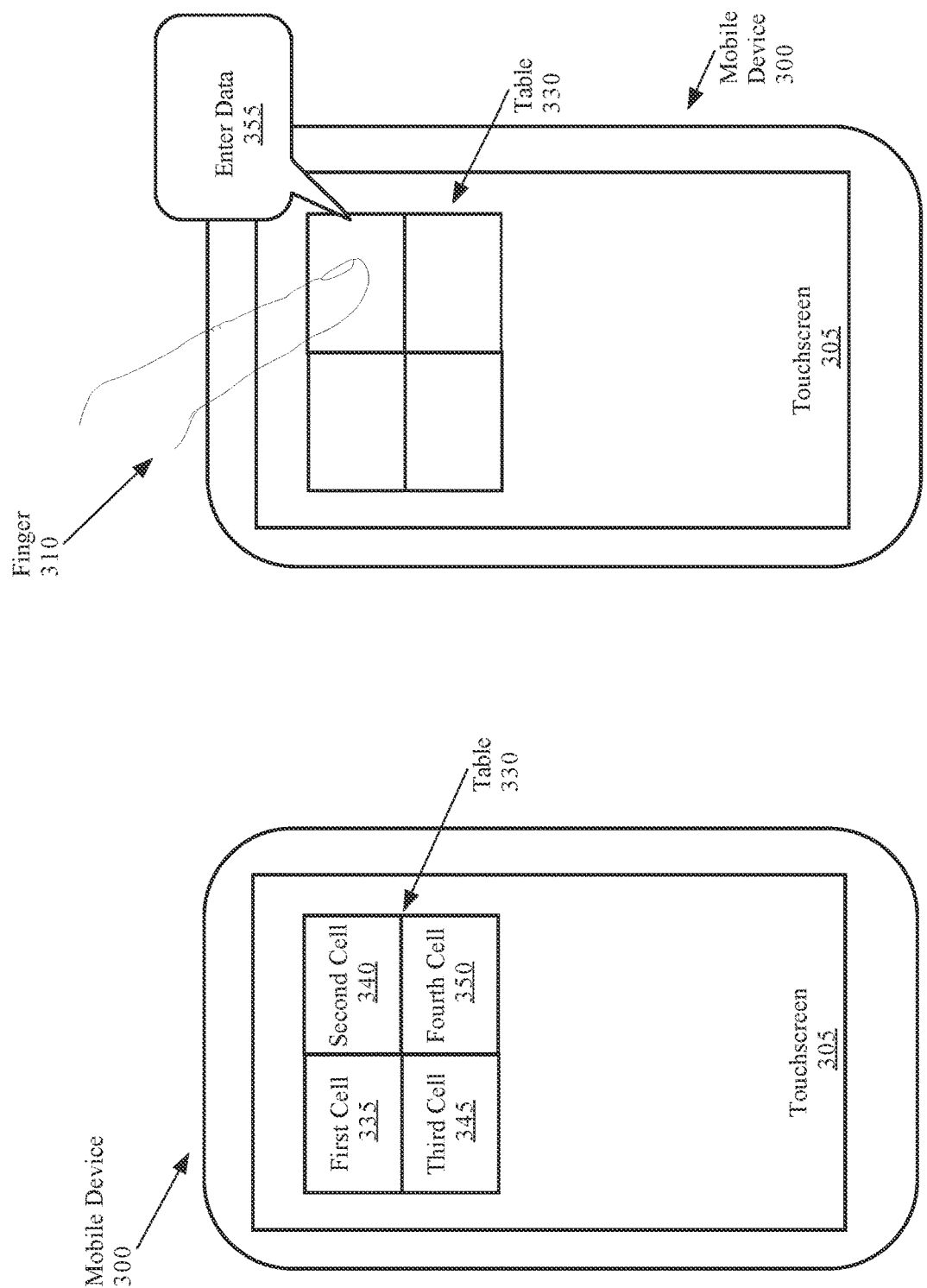

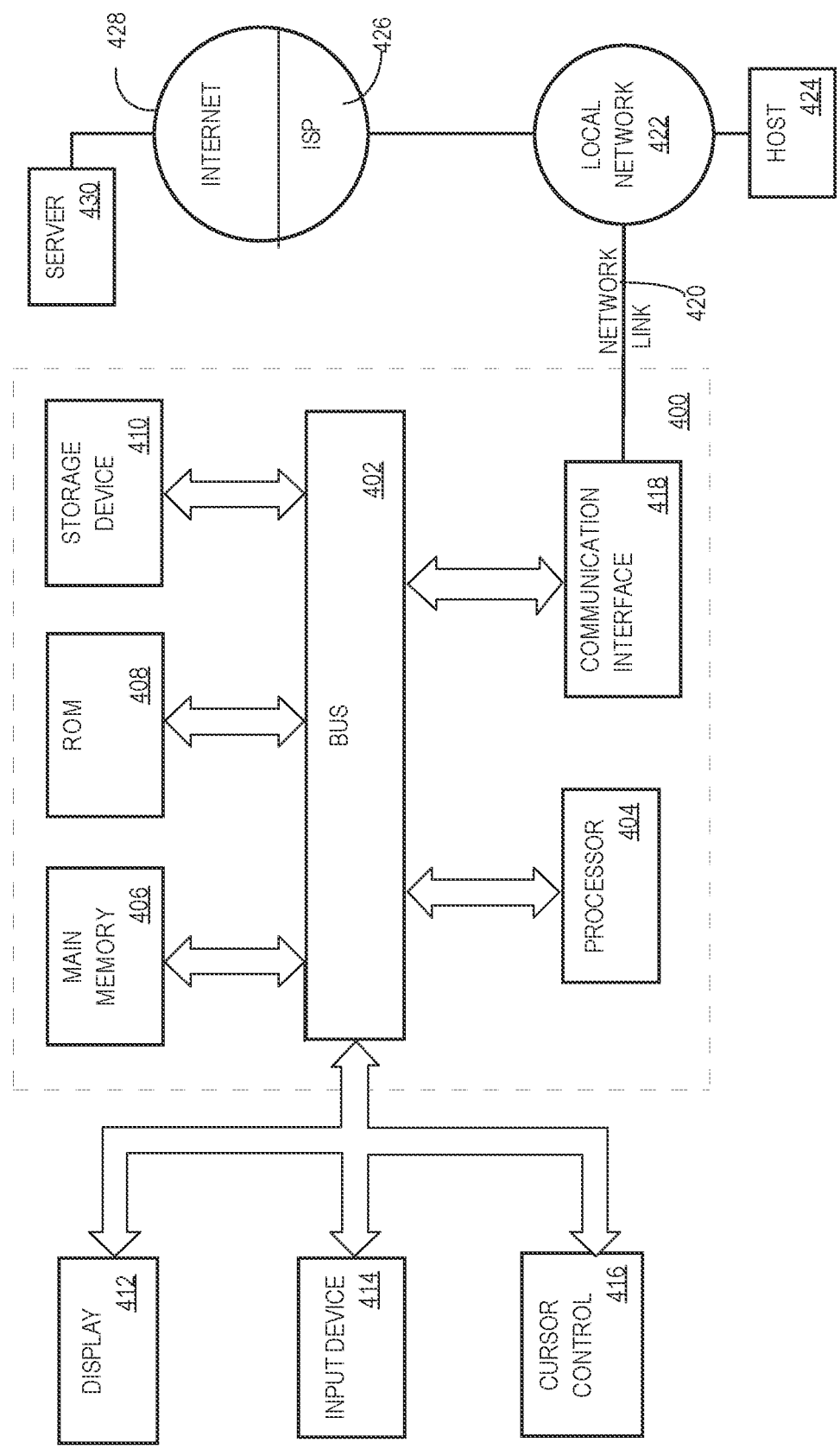

US 11,275,501 B2

CREATING TABLES USING GESTURES

CROSS-REFERENCE TO RELATED APPLICATION(S)

This application is a continuation patent application of U.S. patent application Ser. No. 16/808,940, filed Mar. 4, 2020 and titled "Creating Tables Using Gestures," which is a continuation patent application of application Ser. No. 15/282,806, filed Sep. 30, 2016 and titled "Creating Tables Using Gestures," now U.S. Pat. No. 10,620,824, the disclosures of which are hereby incorporated herein by reference in their entireties.

FIELD

The technical field of the present disclosure is computer hardware, software and computer systems that are programmed to recognize gestures on a touch screen as a form of input or signal. The technical field of the disclosure also is computer hardware, software and systems that are programmed for creating tables in electronic documents.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The popularity of mobile computing devices has been unprecedented and hundreds of millions now are sold each year. Many individuals own multiple mobile devices. For years, people interacted with their mobile devices using physical keyboards, switches or buttons. However, since touchscreen technology has improved, virtually every mobile device has included a touchscreen, and many mobile devices rely on touchscreens as the primary, or only, form of input.

A touchscreen is an electronic input device that is layered on top of a visual display, and is responsive to touch, such as by a finger or stylus, and capable of transforming a point of touch into a set of digital data representing coordinate values in a coordinate system. Touchscreens have caused a tremendous shift in the way people interact with mobile devices. Many interactions with mobile devices through a touchscreen are intuitive and simple. However, not all interactions are this way. Many applications attempt to recreate the interfaces of desktop computers, with many buttons and pull-down menus that are limiting and not user friendly. In some instances, this is due to a desire to rapidly port applications from desktop computer to mobile devices. In other instances, a better way has not been developed. The problem of non-touch optimized ways of interacting with applications is becoming more apparent as the applications on mobile devices gain greater and greater functionality. Thus, additional solutions are needed to improve machine efficiency and make more interactions using a touchscreen simple and intuitive.

BRIEF DESCRIPTION OF THE DRAWINGS

In the drawings:

FIG. 3A, FIG. 3B, FIG. 3C, and FIG. 3D illustrate an example implementation of creating tables using gestures.

FIG. 4 illustrates a computer system upon which an embodiment may be implemented.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Computer-implemented techniques are provided for automatically creating tables in an electronic document or application using input from gestures via a touchscreen. In one embodiment, while an electronic document is displayed on a touchscreen, a gesture of a rectangle is detected using the touchscreen. A second gesture is detected that subdivides the rectangle. For example, a second gesture is detected representing a first line and a second line so that the gesture subdivides the rectangle into four quadrants. When the two gestures occur within a threshold amount of time, then a process or program is programmed to detect or interpret the gestures as a signal to automatically add a table to the document that is displayed on the touchscreen. In response, a table is generated and added to or inserted in the document based on a location of the input; the touchscreen display may be updated to render the table in the document at the point of the gestures. In an embodiment, the table includes at least four cells in a 2×2 format, although other configurations of tables and numbers of cells may be used. Once the table is created, a user may provide a selection gesture in a cell to cause generating a visual interface for entering data into the selected cell. In an embodiment, dragging the edges of the table causes the process or program to respond by increasing the number of rows and/or columns in the table and to update the display. Additional embodiments are described herein.

In one embodiment, a method comprises displaying, on a touchscreen, a document; receiving first input from the touchscreen and determining that the first input comprises a rectangle gesture; receiving second input from the touchscreen and determining that the second input comprises one or more subdivision gestures that signal dividing the rectangle gesture into four quadrants; wherein the first input and the second input are received within a time threshold; in response to receiving the first input and second input within the time threshold, automatically generating a table, wherein the table comprises a plurality of cells; adding the table to the document at a location based on the first input and updating the touchscreen to display the table on the touchscreen; wherein the method is performed by one or more computing devices.

Other embodiments, aspects and features will become apparent from the disclosure as a whole.

Example Computer System Implementation

Figure 1:
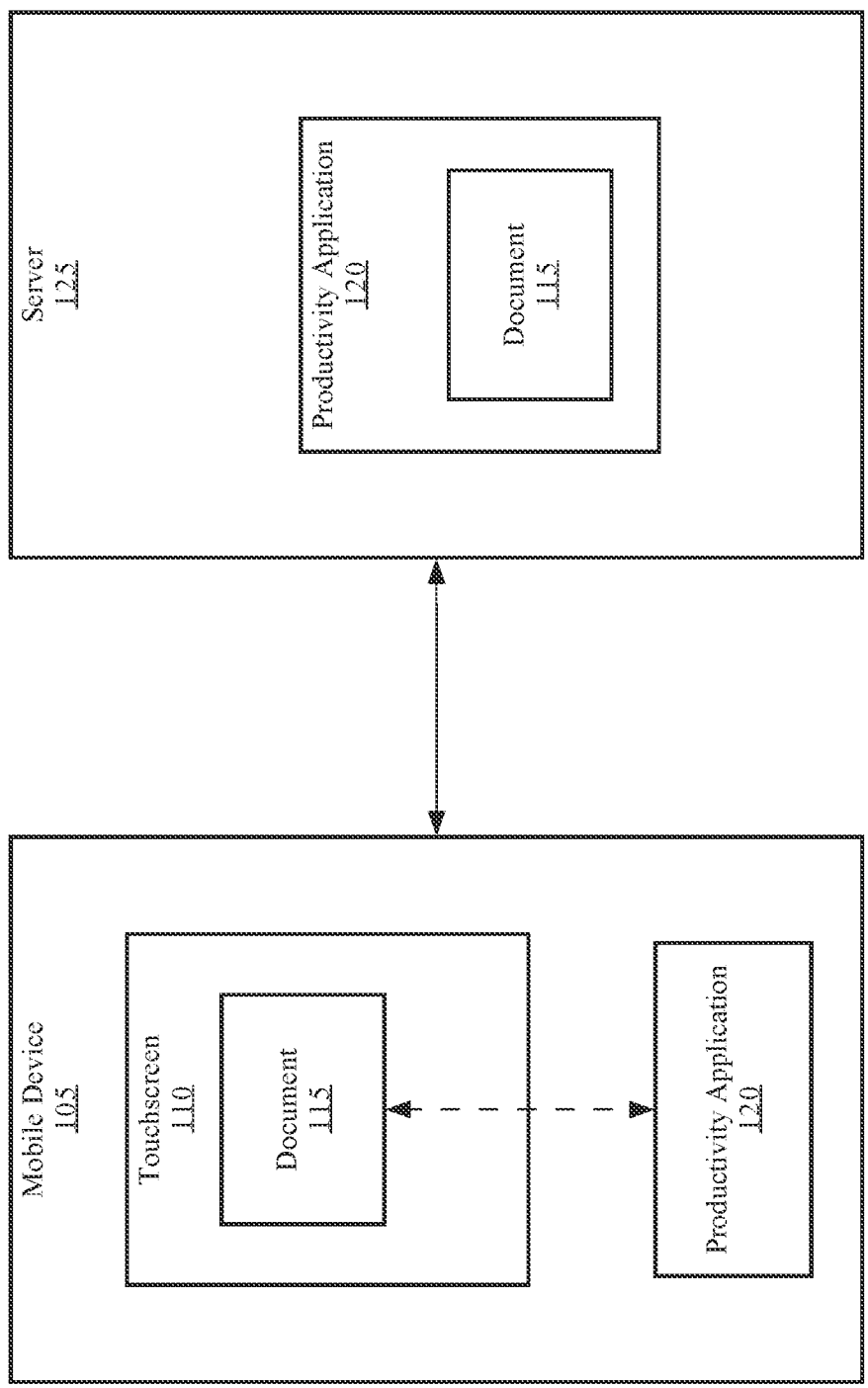
FIG. 1 illustrates an example computer system in which the techniques described may be practiced, according to one embodiment.

FIG. 1 illustrates an example computer system in which the techniques described may be practiced, according to one embodiment. In an embodiment, a computer system comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 105 having a touchscreen 110, an electronic document 115, a productivity application 120, and a server computer 125. Mobile device 105 may be any mobile computing device with a touchscreen including, but not limited to: smartphones, mobile phones, cell phones, tablets, laptop computers, portable digital assistants (PDAs), and the like. Mobile device 105 is communicatively connected to server 125 using any wired and/or wireless connection, such as any combination of a Local Area Network (LAN), a Wide Area Network (WAN), an internetwork, the public Internet, or a company network. Mobile device 105 may include various components that are not shown including, but not limited to, memory or other digital electronic storage, one or more processors, physical buttons, etc. Mobile device 105 may execute various applications (such as productivity application 120, or an operating system) and/or programs that may be installed by the user, manufacture, or other suitable entity. These applications and/or programs are executed by the mobile device 105 to perform various actions and give the users of mobile device 105 additional functionality. Although mobile device 105 may include many different components, at a minimum, mobile device 105 includes touchscreen 110.

In one embodiment, touchscreen 110 is an input device that is layered on top of a visual display, and is responsive to touch, such as by a finger or stylus. The visual display may be a liquid crystal display (LCD) device, OLED device, or other flat screen device. Touchscreen 110 may have any size. Touchscreen 110 may utilize any suitable technologies to receive input from the finger or stylus, such as capacitive sensing, visual or optical, infrared, resistive technologies, or any other technology capable of detecting a touch of a stylus or body part on the touchscreen. Touchscreen 110 may be operated using a driver or other software in connection with an operating system that the mobile device 105 hosts or executes. The driver or other software may provide the input received by the touchscreen 110 in any suitable format, such as an array, with or without processing, for other applications to interpret and use.

In one embodiment, document 115 is a digital electronic document that is created, managed or used by productivity application 120, discussed below. In the drawing figures, document 115 represents both digital data in computer memory that represents an electronic document, and a digital display rendered from the document. Document 115, when displayed, may fill the entire display area of touchscreen 110, or may be displayed on a portion of touchscreen 110. Document 115 may include many different items including, but not limited to: blank spaces, occupied spaces, tables, pictures, images, text, hyperlinks, graphs, charts, video, audio files, other files or documents, attachments, and/or other data. Further, document 115 may be synchronized across multiple devices and exist in copies in memory or storage of multiple devices. For example, a copy of document 115 may be stored locally on mobile device 105 and a second copy of document 115 may be stored on server 125. Any changes made to document 115 that are stored in a first location may be synchronized among different locations in any manner. The version of document 115 displayed on touchscreen 110 may be a version that is stored in local storage of mobile device 105 or on server 125.

In one embodiment, productivity application 120 is executed by mobile device 105. Productivity application 120 may communicate or interface with any other application or software that is executed by the mobile device 105, such as an operating system or drivers, as needed to implement the functionality described herein. Productivity application 120 may be a thin client application or a stand-alone application, and different instances of productivity application 120 may execute on other devices, such as server 125. Productivity application 120 comprises program instructions that are programmed or configured to display documents, such as document 115. Documents, and any items or data contained in the documents, may be displayed using vector display, raster display, rendering script code, or other techniques. Additionally, productivity application 120 comprises program instructions that are programmed or configured to create, interact with and/or modify document 115. Specifically, productivity application 120 allows a user to interact with document 115 by modifying or adding items, such as tables, pictures, images, text, hyperlinks, graphs, charts, video, audio files, other files or documents, attachments, and/or other data, to document 115.

In one embodiment, productivity application 120 comprises program instructions that are programmed or configured to receive input from touchscreen 110. The input may be received in any format and from any suitable component, such as from an operating system or driver of touchscreen 110. The input may be received continuously and/or at specified intervals, and may include any data such as a strength or force of the input and/or a location on the touchscreen where the input occurred. The inputs received by productivity application 120 may represent one or more gestures made by a user. A gesture is an action or series of actions performed on or using the touchscreen, such as a user drawing a shape or tapping the touchscreen.

In one embodiment, productivity application 120 comprises program instructions that are programmed or configured to determine or identify a meaning, type or class of gestures from input received from touchscreen 110. The determination may involve using one or more inputs received from touchscreen 110, transiently storing digital data corresponding to input coordinates received from the touchscreen in memory, and comparing the inputs to one or more previously defined gestures. Alternatively, the determination may be performed by pattern matching, or by transforming sets of digital data points of the input coordinates into vectors and matching sets of vectors to stored vector data associated with particular gestures. Open source program code libraries may be used to transform sets of coordinate or gesture data received over time from the touchscreen into a type value, meaning value or class value for a particular gesture. Type values, meaning values or class values may correspond to geometric shapes, such as triangle, circle, square or rectangle, or to input concepts, such as swipe, hold, drag or tap.

In one embodiment, the productivity application 120 is programmed to determine when the inputs indicate a rectangle gesture and/or a subdivision gesture. In an embodiment, a rectangle gesture indicates drawing a rectangle on touchscreen 110. In an embodiment, a subdivision gesture indicates subdividing a rectangle into four quadrants and may comprise two or more individual gestures. In an embodiment, a subdivision gesture indicates drawing two intersecting generally perpendicular lines within a rectangle, such as a cross, on touchscreen 110. Alternatively, the subdivision gesture may be drawn within the rectangle may have a form or shape other than "+", such as a letter T denoting "table," two strokes that are horizontal or vertical, or any other useful combination of one or more gestures that can be distinctively recognized, within a previously gestured rectangle, to signal generating a table. In some embodiments, angular thresholding may be programmed in which the process or program can distinguish between gestures that indicate an "X" configuration as opposed to a "+" configuration.

In one embodiment, productivity application 120 comprises program instructions that are programmed or configured to determine whether gestures occur over a blank space in the document 115 or over an occupied space of the document 115. A blank space is a portion of document 115 or its display that is blank, and not filled with data or items. An occupied space is a portion of document 115 that is already filled with data or items. When specific gestures occur over occupied space, such as a rectangle gesture, then in one embodiment the productivity application 120 ignores those gestures. This is so that a table is not subsequently created and placed on top of existing data or items, as discussed below. Thus, in some embodiments, a process is programmed to generate and add a table to a document only in response to determining that gestures equivalent to two intersecting generally perpendicular lines have been drawn in a portion or region of an electronic document that does not contain previously entered data.

In one embodiment, productivity application 120 comprises program instructions that are programmed or configured to determine whether gestures are received within a time threshold. The time threshold is an amount of time over which an input(s) or gesture(s) can occur. If the input or gesture takes longer than the time period, the input or gesture is not detected and/or is ignored. The time threshold may be set to any suitable amount of time in a configuration file, hard coding in a program, or by a user, administrator, programmer or other suitable entity. The time threshold may be set separately for individual gestures and/or may be set for a series of gestures. For example, if the time threshold for a rectangle gesture is set to four seconds, a user would have up to four seconds to complete drawing a rectangle on the touchscreen; if a set of gestures is recognized over a period slower than four seconds, then productivity application 120 would not recognize or would ignore the slowly drawn rectangle gesture.

In one embodiment, productivity application 120 comprises program instructions that are programmed or configured to determine whether gestures are within an error threshold. The error threshold allows for user error in gestures. In other words, gestures do not have to be perfect to be detected. For example, a rectangle gesture does not need to be a perfect rectangle with precise ninety degree corners. Rather, the error threshold may allow for any amount of error, such as slightly rounded corners. The error threshold may be set to any suitable amount by a user, administrator, programmer or other suitable entity. The determination that a gesture is within the error threshold may be made in any suitable manner.

In one embodiment, productivity application 120 comprises program instructions that are programmed or configured to generate and place a table in document 115. In an embodiment, the table is placed in document 115 in response to a rectangle gesture and a subdivision gesture. The table may be any size and contain any number of cells, such as a 2×2, 3×3, or other size table. Optionally, the size of the table may be based on a size of the rectangle gesture, with larger table sizes corresponding to larger rectangle gestures. The table may be placed in document 115 at any suitable location. In one embodiment, the table is placed in document 115 based on the rectangle gesture, such as at a location corresponding to the center of the rectangle gesture.

In one embodiment, productivity application 120 comprises program instructions that are programmed or configured to determine gestures for interacting with the table, input data to the table, and/or modify the table. The gestures may be determined from input received from touchscreen 110 as discussed above. Specifically, gestures for interacting with the table may include tapping a cell. When a gesture tapping a cell is detected, in response, the productivity application 120 selects that cell and displays a dialog or interface for inputting data into the selected cell. A visual indication that the cell is selected, such as highlighting, reverse color, or other emphasis may be displayed in some embodiments. The interface may include a keyboard, buttons, and/or any other elements.

Another gesture for interacting with the table is tapping an edge of the table that is shown in the document 115. When a gesture tapping an edge of the table is detected, productivity application 120 may display an interface for modifying the table, such as buttons to add columns and/or rows. Alternatively, tapping an edge may select the table and allow for the table to be moved to a different location within the document.

Another gesture for interacting with the table is dragging an edge of the table that is shown in document 115. When a gesture dragging the edge of the table is detected, productivity application 120 increases or decreases the amount of columns and/or rows of the table, based on how far, and in what directions, the edge is dragged.

In one embodiment, server 125 is any computing device, including but not limited to: server computers, work stations, personal computers, general purpose computers, laptops, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, or network infrastructure devices including, but not limited to, routers, switches, and other computing and/or infrastructure devices. Although a single server 125 is depicted in FIG. 1, any number of servers, spanning one or more physical devices, may be used. Server 125 is communicatively connected to mobile device 105 using any wired and/or wireless connection, such as a LAN, WAN, the Internet, or a company network.

In one embodiment, server 125 executes a copy or instance of productivity application 120, which may include any of the functionality discussed above. The copy or instance of productivity application 120 executing on server 125 may store a copy of document 115, and allow multiple mobile devices to simultaneously access and/or modify document 115, sync changes made by mobile devices, and/or any other functionality.

For purposes of illustrating a clear example, the foregoing description has ascribed certain operations, functions and programming to the productivity application 120 of FIG. 1. However, in other embodiments, the same operations, functions and programming may be implemented in programs or logic that is separate from the productivity application 120, such as a utility program, library or operating system. For example, the functions of recognizing gestures as signaling to insert a table, detecting an available or unoccupied region of a document, and others may be implemented in a library that the productivity application 120 calls.

Example Functional Implementation

Figure 2:
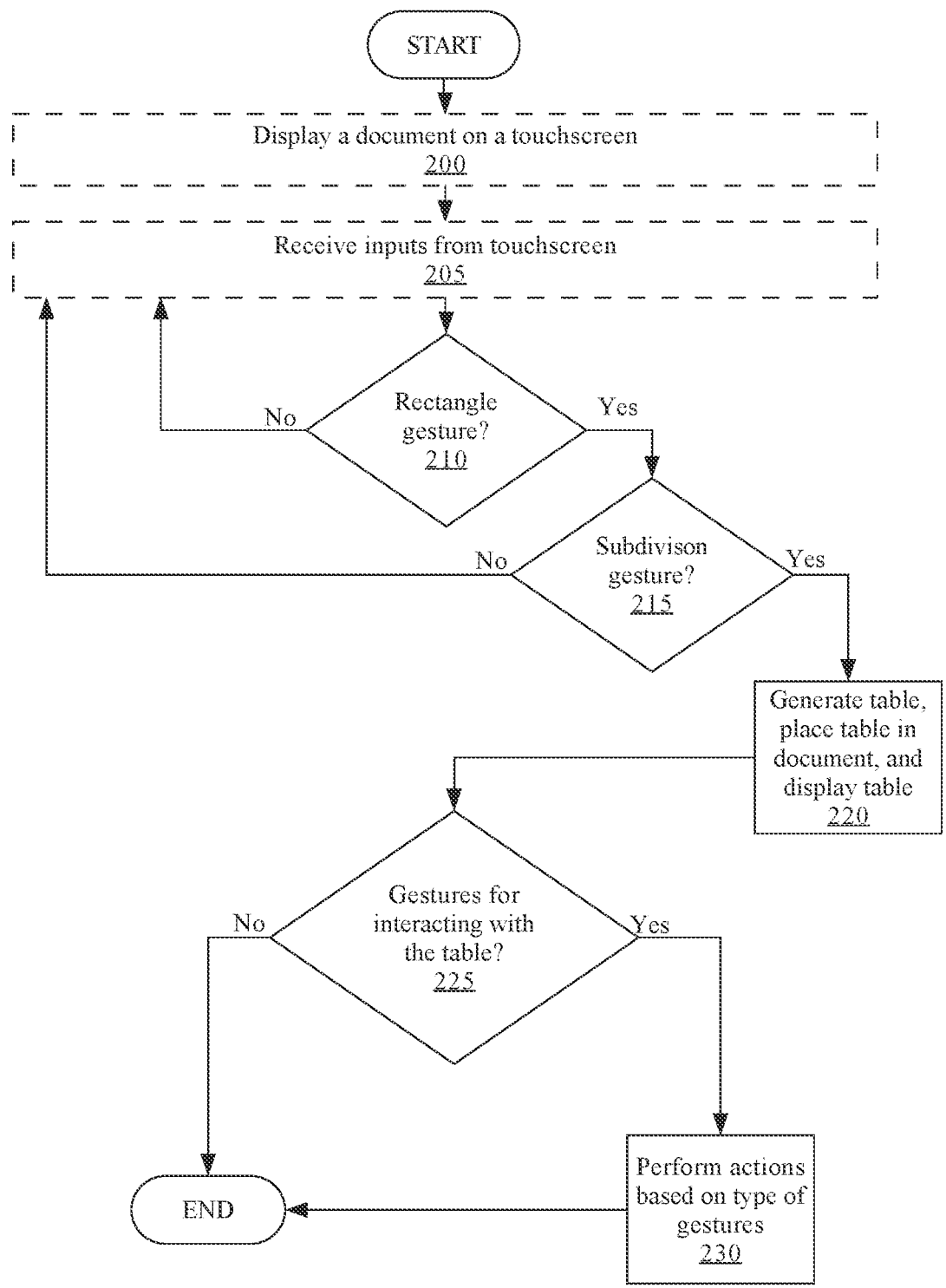
FIG. 2 illustrates a programmable algorithm or method in accordance with an embodiment.

FIG. 2 illustrates an example programmable algorithm or method for creating tables using gestures. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 200, a document is displayed on a touchscreen. As indicated by the dotted lines, the document may be displayed continuously on the touchscreen throughout the following steps. The document may be displayed in any manner, and take up any portion, or all, of the touchscreen. Additional documents, interface items, or other elements may be displayed along with the document.

In step 205, inputs are received from a touchscreen. As indicated by the dotted lines, the inputs may be received continuously from the touchscreen throughout the following steps. The inputs may be received in any format and from any suitable component, such as an operating system or drivers for the touchscreen.

In step 210, a determination is made whether a rectangle gesture is detected in received input. A rectangle gesture represents a user drawing a rectangle on the touchscreen. The determination may be made in any manner, such as by comparing received inputs to predefined gestures. The determination may further involve satisfying an error threshold. An error threshold allows for the input to not perfectly match a predefined gesture. As an example, a rectangle gesture may be defined as a rectangle with perfect 90 degree corners. However, the error threshold may allow for a user to draw a rectangle with one or more curved edges, and still have the input be recognized as a rectangle gesture. However, if the user were to draw a circle or other input/shape that is very different from a rectangle in hopes of the gesture being recognized, that input would not be recognized as a rectangle gesture.

The determination may also further involve satisfying a time threshold. The time threshold is a maximum amount of time over which the gesture may be received. Thus, if the time threshold is 4 seconds, and a user takes 5 seconds to draw a rectangle, the drawing of the rectangle would not be recognized as a rectangle gesture, and the user would need to try again and draw a rectangle faster. Further still, the determination may also involve determining if the input is received over a blank portion or an occupied portion of the document. An occupied portion of the document is a part of the document that already contains items or data, such as a table, picture, etc. If the gesture occurs over an occupied portion of the document, the gesture may be ignored. Conversely, if the gesture occurs over a blank portion of the document, the gesture may be detected or recognized.

If a rectangle gesture is determined to not be present in the received input, the method returns to step 205 to await further inputs. If a rectangle gesture is determined to be present in the received input, the method proceeds to step 215.

In step 215, a determination is made whether a subdivision gesture is detected in received input. A subdivision gesture subdivides the rectangle of step 210 into four quadrants, such as by drawing two intersecting, generally perpendicular lines in the middle of the rectangle. Alternatively, the subdivision gesture may be drawn within the rectangle of step 210 but may have a different form or shape, such as a letter T denoting "table," two strokes that are horizontal or vertical, or any other useful combination of one or more gestures that can be distinctively recognized, within a previously gestured rectangle, to signal generating a table. As in step 210, the determination may be made in any manner, and may involve satisfying an error threshold and/or a time threshold. As an example of an error threshold for the subdivision gesture, the error threshold may allow the user to draw unequal quadrants, and/or not connect the cross to the lines of the rectangle, or any other reasonable errors.

If a subdivision gesture is determined not to be present in the received input, the method returns to step 205 to await further inputs. If a subdivision gesture is determined to be present in the received input, the method proceeds to step 220.

In step 220, a table is generated, placed in the document, and displayed on the touchscreen. The table is generated in any suitable manner, such as using autocomplete. The table may be of a configurable, predetermined size, such as 2×2, although the table may be generated at any size based on any suitable factors, such as the size of the rectangle gesture. The table may be placed in the document based on a location of the rectangle gesture of step 210. Specifically, the center of the rectangle gesture may be used as a center of the table, or any other location may be used. Once placed, the table is displayed on the touchscreen in any suitable manner.

In step 225, a determination is made whether gestures for interacting with the table are received. As in step 210, the determination may be made in any manner, and may involve satisfying an error and/or time threshold. Gestures for interacting with the table may include tapping gestures, used to select individual cells of the table, select the entire table, or other actions. When an individual cell is selected by a tapping gesture, a keyboard, prompt, dialogue, or other interface element may be displayed for entering information into the cell. When the entire table is selected, the table may subsequently be moved by further input, such as dragging or via an interface element. Other gestures for interacting with the table may include dragging the edges of the table to increase a number of columns and/or rows of the table, or any other gestures.

If a gesture for interacting with the table is not determined to be present in the received input, the method ends. If a gesture for interacting with the table is determined to be present in the received input, the method proceeds to step 230.

In step 230, actions are performed based on the type of gesture from step 225. The actions may be performed in any suitable manner, using any interface items, displays, other gestures, etc. After step 230, the method ends.

Using this method, tables may easily and intuitively be created on mobile devices using touchscreens. Previously, slow, clunky menus were required to create tables on mobile devices, if creating tables was even allowed. Many mobile devices were previously limited to interacting with previously created tables, rather than creating new tables. Thus, this method greatly increases the functionality and usability of productivity software on mobile devices.

Example Table Creation Using Gestures

FIG. 3A, FIG. 3B, FIG. 3C, and FIG. 3D illustrate an example of creating tables using gestures.

Figures 3A, 3B:
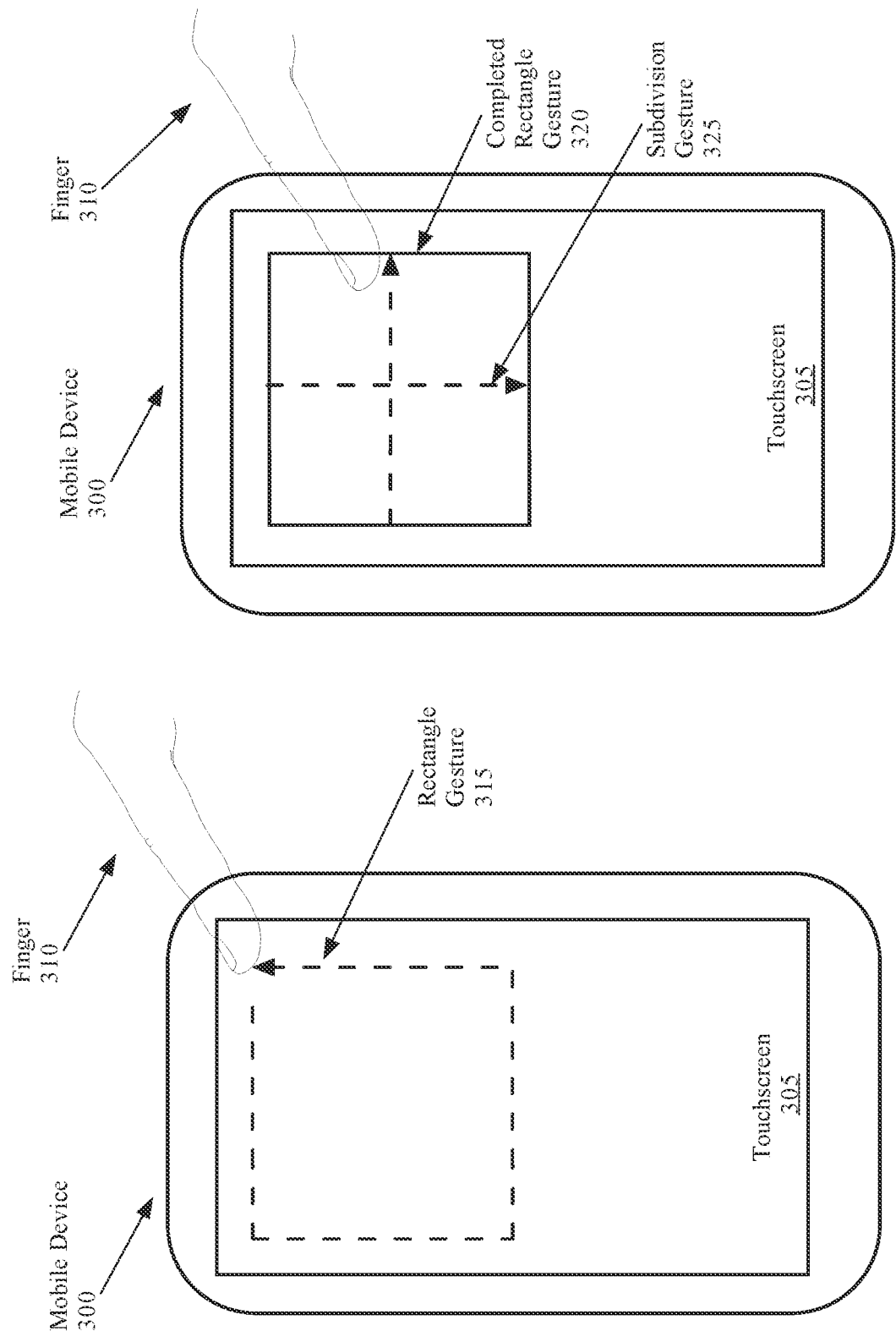

In the embodiment of FIG. 3A, a mobile device 300 includes a touchscreen 305, with which a user is interacting using a finger 310. "Finger," in this context, includes the thumb and any other body part that is capable of touching a touchscreen to signal a tap, swipe, or other gesture. For purposes of illustrating a clear example, FIG. 3A, FIG. 3B, FIG. 3C, and FIG. 3D depict finger 310 but other embodiments may operate in a similar manner in response to input from a stylus or other pointing device. Mobile device 300 in FIG. 3A is executing software such as productivity application 120 which is displaying a digital electronic document on the touchscreen 305. To begin the example, finger 310 provides gestures signifying a rectangle on the touchscreen 305; for example, one or more generally linear gestures may be joined with corner movements or angles to form a continuous or discontinuous path that is rectangular. The productivity software receives the input and determines that a rectangle gesture 315 has been received based upon detecting digital data representing the magnitude and direction of the lines and/or angles and using the gesture detection logic described above for FIG. 2 to associate the data with a rectangle. At this point, the broken lines shown in FIG. 3A for the rectangle gesture 315 need not be visually displayed in the touchscreen 305; that is, the broken lines in FIG. 3A may represent a path of a stylus or body part on the touchscreen, but embodiments are not required to graphically or visually display lines that correspond to the path.

Turning to FIG. 3B, a completed rectangle gesture 320 is shown for reference. In some embodiments, the productivity application 120 or other programming may cause the touchscreen to display lines or other graphics on the touchscreen to visually indicate that a rectangle was recognized. Thus, the touchscreen 305 may be updated to show or display a square or rectangle that is visually perceivable. This step is optional and FIG. 3B also may represent an embodiment in which there is no visual display of a rectangle and the application 120 merely waits for second input that may indicate subdividing the rectangle that was recognized from the first input.

In FIG. 3B, as a next example step, finger 310 is used to subdivide the rectangle, as indicated by the dotted lines of a subdivision gesture 325. The productivity software receives the input of the user subdividing the rectangle, and determines that a subdivision gesture 325 has been received. As noted above, the use of perpendicular linear gestures is shown in FIG. 3B merely as one example, and in other embodiments a subdivision gesture may be recognized based upon gestures or contact with the touchscreen that signifies other shapes or symbols.

Referring now to FIG. 3C, in response to the rectangle gesture of FIG. 3A and the subdivision gesture of FIG. 3B, the productivity application 120 has automatically generated a table 330, placed the table at a location based on where the user drew the rectangle in FIG. A, and displayed the table on the touchscreen 305 to visually show a graphical or visual representation of the table. Placing the table may include adding the table to an electronic document by updating digital data associated with the electronic document in the mobile device 300 or in a server computer as in FIG. 1. In the example of FIG. 3C, table 330 includes four cells: first cell 335, second cell 340, third cell 345, and fourth cell 350. The use of four cells in a 2×2 arrangement may comprise a default method of table generation, and in other embodiments, a different number of rows and columns may be used. The touchscreen 305 is visually updated, in an embodiment, to graphically display table 330 and the cells shown in the touchscreen.

Turning last to FIG. 3D, as an example, finger 310 is shown in position to provide a selection gesture in a specific cell 340 of table 330. In various embodiments, the selection gesture may comprise a tap, double tap, flick, swipe, or other gesture that indicates selection. In response to detecting a selection gesture at the specific cell 340, a visual interface 355 for entering data is displayed on touchscreen 305. In an embodiment, the visual interface 355 is programmed to receive input of data using, for example, a keyboard or other suitable method. The keyboard may comprise a hardware keyboard having physical buttons, or a touchscreen keyboard.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and stored in storage device 410, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for generating a table, the method comprising:
    receiving a first gesture input at a location of an electronic document that is unoccupied, the first gesture input approximating an enclosed shape;
    in response to the first gesture input and without accessing a menu of an application, generating a portion of the table for insertion in the electronic document;
    within a predetermined time threshold, receiving a second gesture input within the portion of the table;
    in response to the second gesture input and without accessing the menu of the application, subdividing the table into multiple regions; and
    rendering the table at the location in the electronic document, the table having multiple cells defined, at least in part, by the second gesture input.

2. The method of claim 1, further comprising, within the predetermined time threshold, receiving a third gesture input within the portion of the table, wherein the multiple cells are defined, at least in part, by the second gesture input and the third gesture input.

3. The method of claim 2, wherein:
the second gesture input and the third gesture input are perpendicular to each other; and
the multiple cells define at least four cells.

4. The method of claim 1, wherein:
the location of the electronic document that is unoccupied is a first location; and
the method further comprises:
receiving a third gesture input at a second location of the electronic document that is occupied; and
ignoring the third gesture input.

5. The method of claim 1, wherein the first gesture input approximates a rectangular shape.

6. The method of claim 5, wherein the first gesture input corresponds to the rectangular shape within a predefined error threshold.

7. The method of claim 1, further comprising, in response to receiving the first gesture input, determining whether the first gesture input satisfies an error threshold, the error threshold specifying a potential deviation from the enclosed shape.

8. A method for creating an interactable graphical element using a touchscreen of an electronic device, the method comprising:
receiving, via the touchscreen and at an unoccupied location of an application executed by the electronic device, a first gesture approximating an enclosed shape;
receiving, via the touchscreen, without accessing a menu of the application, and within the enclosed shape defined by the first gesture, a second gesture dividing an internal area of the enclosed shape into one or more subdivisions, the second gesture received subsequent to receiving the first gesture and occurring within a predetermined time threshold;
in response to determining that the second gesture is complete and without accessing the menu, generating a table having a shape that corresponds to the first gesture; and
placing the table within the unoccupied location of the application.

9. The method of claim 8, further comprising:
subsequent to placing the table within the unoccupied location of the application, receiving a third gesture within a cell of the table; and
in response to receiving the third gesture, editing the cell of the table.

10. The method of claim 8, wherein the first gesture corresponds to a perimeter of a rectangle.

11. The method of claim 10, further comprising determining that the first gesture is within an error threshold, the error threshold corresponding to a deviation from the perimeter of the rectangle.

12. The method of claim 8, further comprising, subsequent to receiving the first gesture and before receiving the second gesture, causing display of a table outline corresponding to a perimeter of the table.

13. The method of claim 8, further comprising:
subsequent to placing the table in the application, causing display of a first interface button that is configured for increasing a number of columns and a second interface button for increasing a number of rows;
receiving a user input that selects the first interface button; and
automatically updating the table to include an additional column.

14. The method of claim 8, wherein the second gesture comprises multiple gestures, each gesture of the multiple gestures corresponding to a line within the enclosed shape.

15. The method of claim 14, wherein a number of cells of the table is based on a number of the multiple gestures.

16. The method of claim 8, wherein the application is an electronic document.

17. A system for causing generation of a table, the system comprising:
one or more processors; and
an electronic digital memory storing one or more sequences of instructions which, when executed by the one or more processors, cause the one or more processors to:
receive a first gesture input provided to an application, the first gesture input approximating an enclosed shape and located at a location in the application that is unoccupied;
in response to the first gesture input, cause generation of a portion of the table for insertion in the application;
within a predetermined time threshold, receive a second gesture input within the portion of the table;
in response to the second gesture input, cause the table to subdivide into multiple regions; and
cause the table to be rendered at the location in the application, the table having multiple cells defined, at least in part, by the second gesture input.

18. The system of claim 17, further comprising a touchscreen usable to control operations of the application, wherein the first gesture input is performed on the touchscreen.

19. The system of claim 17, wherein the application corresponds to an electronic document.

20. The system of claim 17, wherein the enclosed shape is a rectangle.

* * * * *